US012153725B2

(12) United States Patent
Meneely et al.

(10) Patent No.: US 12,153,725 B2
(45) Date of Patent: Nov. 26, 2024

(54) HUMAN EYES DESIGN: FIRST PERSON VR CHARACTERS FOR TESTING INCLUSIVE DESIGN SOLUTIONS (71) Applicant: University of Florida Research Foundation, Inc., Gainesville, FL (US)

(72) Inventors: Jason Meneely, Gainesville, FL (US); Kyle G. Walsh, Gainesville, FL (US); César Cristóbal González Peláez, Gainesville, FL (US)

(73) Assignee: UNIVERSITY OF FLORIDA RESEARCH FOUNDATION, INC., Gainesville, FL (US)

(*) Notice: Subject to any disclaimer, the term of this patent is extended or adjusted under 35 U.S.C. 154(b) by 0 days.

(21) Appl. No.: 17/799,435

(22) PCT Filed: Feb. 12, 2021

(86) PCT No.: PCT/US2021/017772
§ 371 (c)(1),
(2) Date: Aug. 12, 2022

(87) PCT Pub. No.: WO2021/163418
PCT Pub. Date: Aug. 19, 2021

(65) Prior Publication Data
US 2023/0100973 A1 Mar. 30, 2023

Related U.S. Application Data (60) Provisional application No. 62/975,518, filed on Feb. 12, 2020.

(51) Int. Cl.
G09G 5/00 (2006.01)
G06F 3/01 (2006.01)

(52) U.S. Cl.
CPC ............. *G06F 3/011* (2013.01); *G06F 3/016* (2013.01)

(58) Field of Classification Search
CPC ...... G06F 3/011; G06F 3/016; G06F 3/04815; G06F 3/04845; G06F 3/04842; G06F 3/0346
(Continued)

(56) References Cited

U.S. PATENT DOCUMENTS

2007/0066394 A1 3/2007 Keda et al.
2017/0266551 A1* 9/2017 Baba ............... A63F 13/428
(Continued)

OTHER PUBLICATIONS

Chowdhury, et al., "Information recall in a virtual reality disability simulation", ResearchGate, Association for Computing Machinery, Nov. 8-10, 2017.
(Continued)

*Primary Examiner* — Jennifer T Nguyen
(74) *Attorney, Agent, or Firm* — Thomas | Horstemeyer, LLLP (57) ABSTRACT Various examples are related to first person virtual reality (VR) characters suitable for testing of inclusive design solutions. In one example, a virtual reality (VR) system including a VR headset that can display a simulated VR environment to a user; controllers that can receive inputs from the user; and a computing device that can execute a VR application to simulate a VR character in the simulated VR environment, where the VR character simulates a physical impairment produced by a disability. Interactive first person VR characters with haptic capabilities operating in a simulated environment can provide feedback to the user that would not be available otherwise without physically constructing the environment.

20 Claims, 5 Drawing Sheets (58) Field of Classification Search
USPC .......................................................... 345/156
See application file for complete search history.

(56) References Cited

U.S. PATENT DOCUMENTS

| | | | | |
|---|---|---|---|---|
| 2019/0041974 | A1* | 2/2019 | Matsuike | G06F 3/012 |
| 2021/0165495 | A1* | 6/2021 | Kawakami | G06F 3/0346 |
| 2022/0253197 | A1* | 8/2022 | Kim | G06F 3/04815 |

OTHER PUBLICATIONS

Bruder, et al., "Redirecting walking and driving for natural navigation in immersive virtual environments", IEEE Transaction on Visualization and Computer Graphics, vol. 18, Issue 4, Mar. 4, 2012.
International Search Report for PCT/US2021/17772 mailed May 5, 2021.

* cited by examiner

HUMAN EYES DESIGN: FIRST PERSON VR CHARACTERS FOR TESTING INCLUSIVE DESIGN SOLUTIONS

CROSS REFERENCE TO RELATED APPLICATIONS

This application is the 35 U.S.C. § 371 national stage application of PCT Application No. PCT/US2021/017772, filed Feb. 12, 2021, which claims priority to, and the benefit of, U.S. Provisional Application No. 62/975,518, filed Feb. 12, 2020, both of which are hereby incorporated by reference herein in their entireties.

BACKGROUND

A wide range of virtual reality (VR) systems are currently available in the market for predominantly gaming applications. These VR systems provide three-dimensional (3D) visualization of environments through VR googles, hand controllers, and other sensing and feedback devices. It is also possible to simulate designs for 3D visualization of areas in structures and buildings. Such visualization can aid in the development of a final design and avoid potentially costly modifications during fabrication. This can be especially effective when considering perspectives other than a user's normal point of view. Simulating such a change can provide information to a designer that would not be considered otherwise.

SUMMARY

Aspects of the present disclosure are related to first person virtual reality (VR) characters (or avatars) that can provide feedback to a user in a simulated environment. The VR character can simulate a physical impairment produced by a disability. In one aspect, among others, a VR system comprises a VR headset configured to display a simulated VR environment to a user; first and second controllers configured to receive inputs from the user; and a computing device communicatively coupled to the VR headset and the first and second controllers. The computing device can be configured to execute a VR application that causes the computing device to simulate a VR character in the simulated VR environment, where the VR character simulates a physical impairment produced by a disability.

In one or more aspects, the physical impairment can comprise restriction of movement to a wheelchair. Execution of the VR application can cause the computing device to simulate a wheelchair character in the simulated VR environment, where movement and orientation of the wheelchair character in the simulated VR environment can be adjusted by the computing device in response to inputs received by the first and second controllers. The movement and orientation of the wheelchair character can be adjusted based upon grip and movement applied to one or both of the first and second controllers by the user. The grip can be applied to the first and second controllers through a trigger on each controller. Direction and velocity of each controller can be determined. The movement and orientation of the wheelchair character can be adjusted based upon the direction and velocity of the first and second controllers. The wheelchair character can be rotated when the directions of the first and second controllers are in opposite directions. Speed of rotation can be based upon the velocity of the first and second controllers. The wheelchair character can be rotated when the first controller is stationary and the second controllers is moved in one direction. The wheelchair character can be accelerated forward or backward when the directions of the first and second controllers are the same and the velocities of the first and second controllers are substantially equal.

In various aspects, at least one of the first and second controllers can be stationary when being gripped by the user. The wheelchair character can be rotated when only one of the first and second controllers is gripped and stationary. Speed of rotation can be based upon an amount of compression of the one controller. The wheelchair character can decelerate when both of the first and second controllers are gripped and stationary. In some aspects, the wheelchair character can be simulated to operate in an electric mode. The movement and orientation of the wheelchair character can be adjusted based upon movement of a joystick on one of the first and second controllers by the user. Movement and rotation of the wheelchair character can be based upon direction of the joystick. The wheelchair character can decelerate when the joystick returns to a center position. In one or more aspects, the first and second controllers can be configured to provide vibrational feedback to the user based upon the movement of the wheelchair character in the simulated VR environment. A first level of vibrational feedback can be provided to the user by the first or second controller when gripped by the user. A second level of vibrational feedback can be provided to the user when the wheelchair character is in motion. The vibrational feedback can stop when the grip on the first or second controller is released by the user.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various embodiments of methods and systems related to first person virtual reality (VR) characters (or avatars) that can be used for testing of inclusive design solutions. Interactive first person VR characters including haptic capabilities operating in a simulated environment can provide feedback to the user that would not be available otherwise without physically constructing the environment. First person VR characters can simulate impaired abilities for the user to assess the usability of the proposed design. Impaired abilities can include, but are not limited to, low-vision disorders (e.g., glaucoma, cataracts, macular degeneration and color blindness) or people in wheelchairs. Reference will now be made in detail to the description of the embodiments as illustrated in the drawings, wherein like reference numbers indicate like parts throughout the several views. In addition to latency, resolution and display quality Designers such as, e.g., architects, engineers, contractors, builders and game developers consider many conditions when developing an environmental design. While other perspectives are taken into account, consideration of these conditions can be limited by the designer's experience and personal perspective. For example, when designing (or redesigning) a work or retail space the architect should consider accessibility for handicapped individuals. This can include door widths, spacing between built-in features and heights of cabinets and counters. While standards can, and have, been developed to account for some of the challenges faced by handicapped individuals, it can be difficult for the designer to evaluate how usable a design will be when completed.

VR simulation offers the ability to visualize and experience the design without having to actually construct the environment. This can be especially helpful when designing spaces for handicapped individuals who, e.g., navigate the world in a wheelchair (or other mobility device), have visual restrictions, or have other impairments or restrictions. By using VR systems, the designer can experience the designed environment in a similar fashion as a handicapped individual. As a user moves through the simulated environment, the VR system can restrict the user's vision, perspective, and/or movement in a fashion similar to that experienced by a handicapped individual. In this way, the designer can directly experience deficiencies in his design, which can provide knowledge that is not readily available otherwise. Providing such knowledge can reduce costs and accelerate the design time of a project.

Figure 1A:
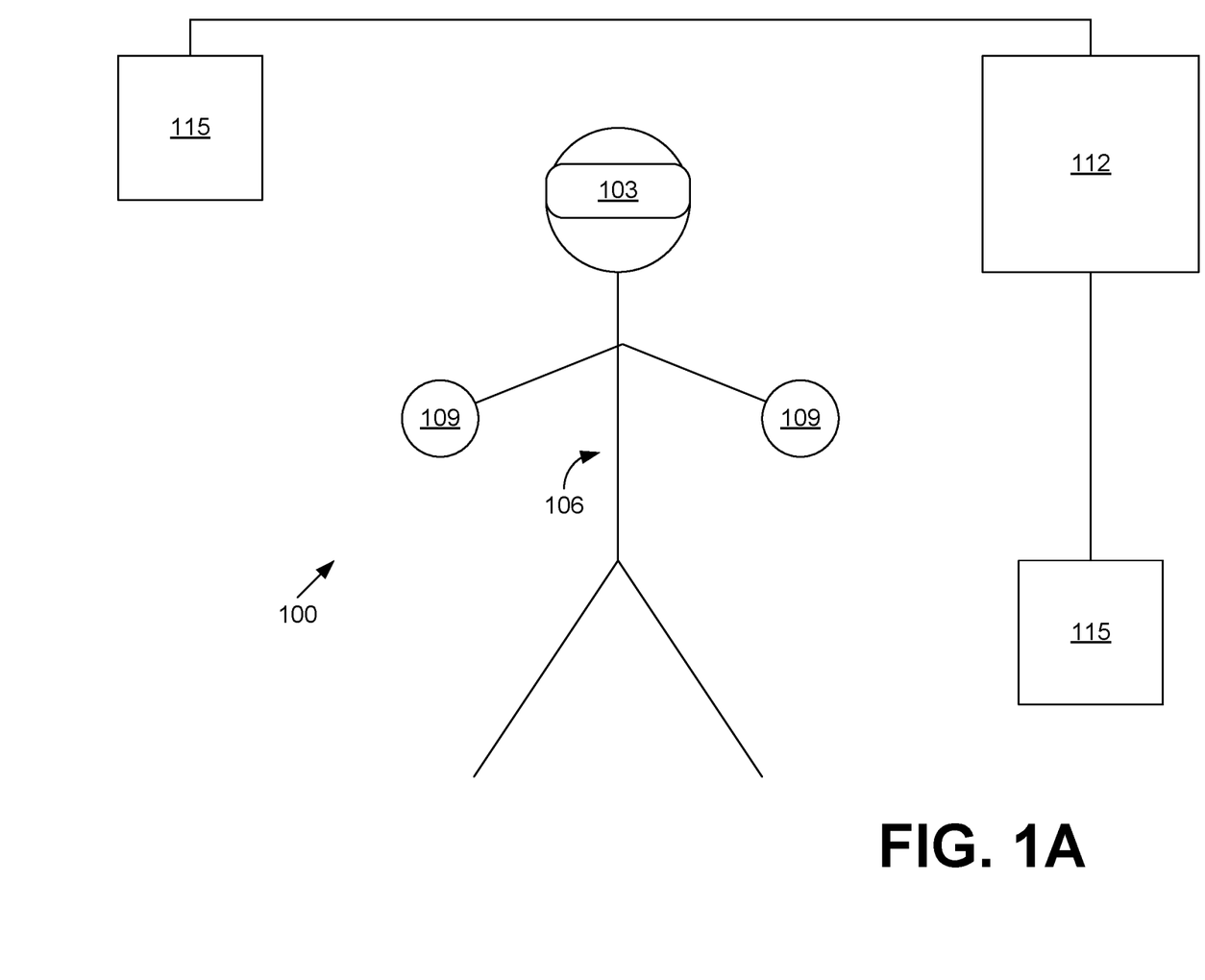
FIGS. 1A and 1B are schematic diagrams illustrating an example of a virtual reality (VR) system, in accordance with various embodiments of the present disclosure.

Referring to FIG. 1A, shown is an example of a VR system 100 that can be used for visualization of a wide range of environments. A VR system 100 can comprise a VR headset 103 configured to visually display the simulated environment to the user 106 when worn. The VR headset 103 can comprise a stereoscopic display providing separate images for each eye and stereo sound. In addition, the VR headset 103 can include audio outputs (e.g., speakers or head phones) and tactile outputs (e.g., vibratory or other haptic devices) to provide acoustic and physical feedback to the user 106. The VR headset 103 can also comprise head motion tracking sensors (e.g., gyroscopes, accelerometers, magnetometers, structured light systems, etc.) for sensing motion, position and orientation of the head of the user 106. Eye tracking can also be included in the VR headset 103.

The VR system 100 can also include controllers 109 that can held by the user 106 (or attached, e.g., to the wrist of the user). The controllers 109 can be configured to receive inputs from the user 106 and provide feedback signals to the user 106. For example, the controllers 109 can include sensors configured to detect orientation, movement and/or gripping force of the hands (or other body part) of the user 106. In addition, the controllers 109 can include a combination of buttons, switches, triggers, joysticks, touchpads and/or other input sensors that can be used to provide inputs to the VR system 100. The controllers 109 can be handheld remote controllers that have a linear arrangement (e.g., Samsung Gear controllers) or an ergonomically designed arrangement (e.g., Oculus Touch controllers), or can be configured as gloves that can be worn by the user 106.

The VR system 100 includes a computing device 112 that executes the VR simulation. The computing device 112 can be communicatively coupled to the VR headset 103 and controllers 109 through wired or wireless connections. The computing device 112 receives indications of user inputs or activities from the VR headset 103 and/or controllers 109 and, through the VR simulation executed by the computing device 112, provides data or control signals to the VR headset 103 and/or controllers 109 to adjust the environment being displayed to the user 106 or provide feedback to the user 106 based on the actions of the user 106.

The computing device 112 can be connected to one or more sensors 115 that can be used to track the movement of the user 106 wearing the VR headset 103 and controllers 109. For example, the sensors 115 can include image capture devices that can be used to monitor movements of the user 106, which can be utilized by the computing device 112 to adjust the VR simulation being displayed to the user 106 though the VR headset 103. The sensors 115 can also include sensors that can track the positioning of the VR headset 103 and controllers 109.

Figure 1B:
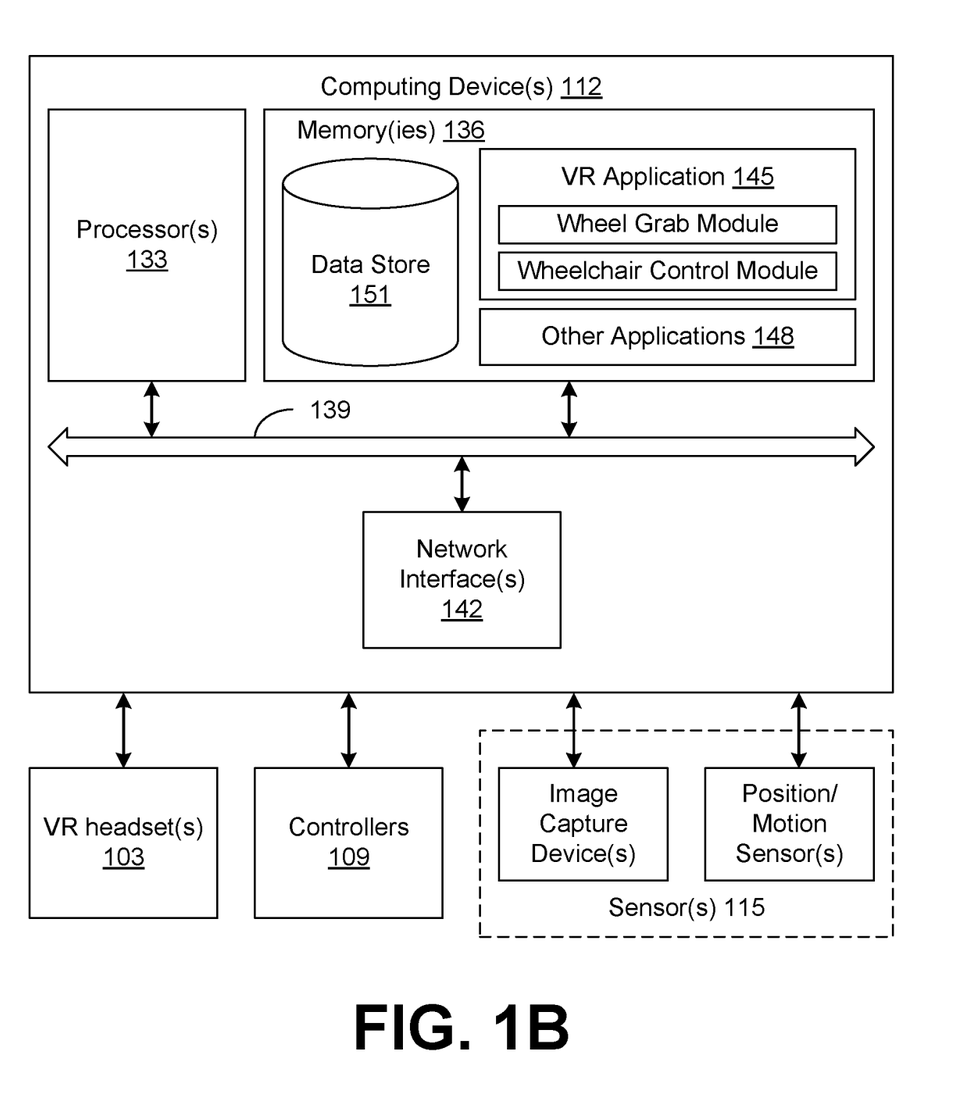

FIG. 1B shows a schematic block diagram illustrating an example of the computing device 112. In some embodiments, among others, the computing device 112 may comprise one or more computing device such as, e.g., a smartphone, tablet, computer, etc. The computing device 112 includes at least one processor circuit, for example, having a processor 133 and a memory 136, both of which are coupled to a local interface 139. To this end, each computing device 112 may comprise, for example, at least one server computer or like device, which can be utilized in a cloud based environment. The local interface 139 may comprise, for example, a data bus with an accompanying address/control bus or other bus structure as can be appreciated.

In some embodiments, the computing device 112 can include one or more network interfaces 142. The network interface 142 may comprise, for example, a wireless transmitter, a wireless transceiver, and/or a wireless receiver. The network interface 142 can communicate to a remote computing device or other components of the VR system 100 using a Bluetooth, WiFi, or other appropriate wireless protocol. As one skilled in the art can appreciate, other wireless protocols may be used in the various embodiments of the present disclosure. The network interface 142 can also be configured for communications through wired connections. In addition, the computing device 112 can be in communication with VR headset(s) 103 and controllers 109 utilized by one or more user 106, such as the example in FIG. 1A.

Stored in the memory 136 are both data and several components that are executable by the processor(s) 133. In particular, stored in the memory 136 and executable by the processor 133 can be a VR application 145, and potentially other applications 148. In this respect, the term "executable" means a program file that is in a form that can ultimately be run by the processor(s) 133. Also stored in the memory 136 may be a data store 151 and other data. In addition, an operating system may be stored in the memory 136 and executable by the processor(s) 133. It is understood that there may be other applications that are stored in the memory 136 and are executable by the processor(s) 133 as can be appreciated.

Examples of executable programs may be, for example, a compiled program that can be translated into machine code in a format that can be loaded into a random access portion of the memory 136 and run by the processor(s) 133, source code that may be expressed in proper format such as object code that is capable of being loaded into a random access portion of the memory 136 and executed by the processor(s) 133, or source code that may be interpreted by another executable program to generate instructions in a random access portion of the memory 136 to be executed by the processor(s) 133, etc. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

The memory 136 is defined herein as including both volatile and nonvolatile memory and data storage components. Volatile components are those that do not retain data values upon loss of power. Nonvolatile components are those that retain data upon a loss of power. Thus, the memory 136 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (M RAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 133 may represent multiple processors 133 and/or multiple processor cores, and the memory 136 may represent multiple memories 136 that operate in parallel processing circuits, respectively. In such a case, the local interface 139 may be an appropriate network that facilitates communication between any two of the multiple processors 133, between any processor 133 and any of the memories 136, or between any two of the memories 136, etc. The local interface 139 may comprise additional systems designed to coordinate this communication, including, for example, performing load balancing. The processor 133 may be of electrical or of some other available construction.

Although the VR application 145, and other various applications 148 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the VR application 145, that comprises software or code can be embodied in any non-transitory computer-readable medium for use by or in connection with an instruction execution system such as, for example, a processor 133 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the VR application 145, may be implemented and structured in a variety of ways. For example, one or more applications described may be implemented as modules or components of a single application. For example, the VR application 145 can include a wide range of modules such as, e.g., a wheel grip module, a wheelchair control module, or other modules that can provide specific functionality to the simulated environment. Further, one or more applications described herein may be executed in shared or separate computing devices or a combination thereof. For example, a plurality of the applications described herein may execute in the same computing device 112, or in multiple computing devices in the same computing environment. To this end, each computing device 112 may comprise, for example, at least one server computer or like device, which can be utilized in a cloud based environment.

The VR application 145 will now be discussed with respect to simulation of a wheelchair operating within the simulated 3D environment of a designed architectural space. As previously discussed, the VR application can simulate first person VR characters that use a wheelchair for the user 106 to assess the usability of the proposed design. The implemented wheelchair simulation was designed for use in a commercially available VR application (e.g., Oculus Rift) that includes a VR headset 103 with head-mounted display and associated handheld touch controllers 109. For the VR simulation to provide a realistic feel to the user 106, it is desirable to utilize a VR application with high framerate capabilities and quality graphical display capabilities. The handheld controllers 109 provide the ability to accurately simulate the hand activities of an individual in the wheelchair. They allow the user 106 to make a wide variety of hand gestures and actions including gripping the controllers 109 as if the user 106 was gripping and moving the wheels of a wheelchair. The gripping action can be immediately reflected in the VR simulation just as the user 106 imagines. Use of the handheld controllers 109 allows the user to sit in a standard chair to experience the appropriate perspective. The chair can be a standard chair without arm rests to avoid incidental contact, however chairs with arm rests can be used to provide the user 106 with the feel of an actual wheel chair.

The wheelchair simulation was implemented in the context of an internal architectural space (e.g., a room, house or retail space design), but the wheelchair simulation is equally applicable to other environments such as, but not limited to, building access, parks and gardens, or other potential situations where a wheelchair may be present. The simulated 3D environment was scaled to the appropriate size based on the design dimensions, and object colliders were included for static items (e.g., counters, walls, etc.) to mimic the real world and not allow the VR character to pass through these items. The wheelchair simulation can be configured to provide feedback to the user 106 through the controllers 109 in response to movement within the simulated environment. For example, the controllers 109 may be pulsed or vibrated when movement of the wheels or the wheelchair is being restricted or prevented.

In addition to the first person VR character, a wheelchair character was developed to aid in the visualization for the user 106. The wheelchair character can be sized for an average human individual. For example, dimensions of a wheelchair that would be used by an individual (female or male) with a height in the range of about 5 foot 4 inches to about 5 foot 9 inches can be used as a standard size. The VR simulation can provide images of the user's hands when interacting with the wheel chair. The wheelchair character can be configured to operate in (or switch between) one of two standard modes: manual or electric. Selection of the operational mode can be through one or both controllers 109.

As can be appreciated, in the manual mode the wheelchair character is maneuvered through the simulated environment using the controllers 109 to grab and turn the wheels of the wheelchair character. For example, gripping the wheels can be implemented through a trigger located at one end of the controller handle or one or more contact buttons (or pressure pads) located on the side of the controller handle. The manual speed of movement will be dictated by the movement (speed and direction) of the user's hands when gripping and turning the wheels and whether the simulated environment allows the wheelchair to move in the fashion desired by the user 106. By moving only one hand, or moving both hands in opposite directions, the wheelchair character can be turned. By taking into account the simulated friction (or resistance with the ground) and/or inertia of the wheelchair character and VR character in the wheelchair, continual movement of the wheelchair can be simulated to provide a more realistic feel for the user 106. For instance, the amount of depression of the trigger or contact buttons (or pressure pads) can be equated to the gripping force being applied to the wheel of the wheelchair to slow down or control its motion.

In the electric mode, operation of the wheelchair character can be carried out using a joystick on a controller 109, similar to an actual electric wheelchair. As with an actual electric wheelchair, movement of the wheelchair character can be controlled by moving when the joystick is pressed in a desired direction and stopping when the joystick returns to its centered position. The wheelchair character can be simulated to move at a constant speed similar to most actual electric wheelchairs, or can be designed for variable speed.

Figure 2A:
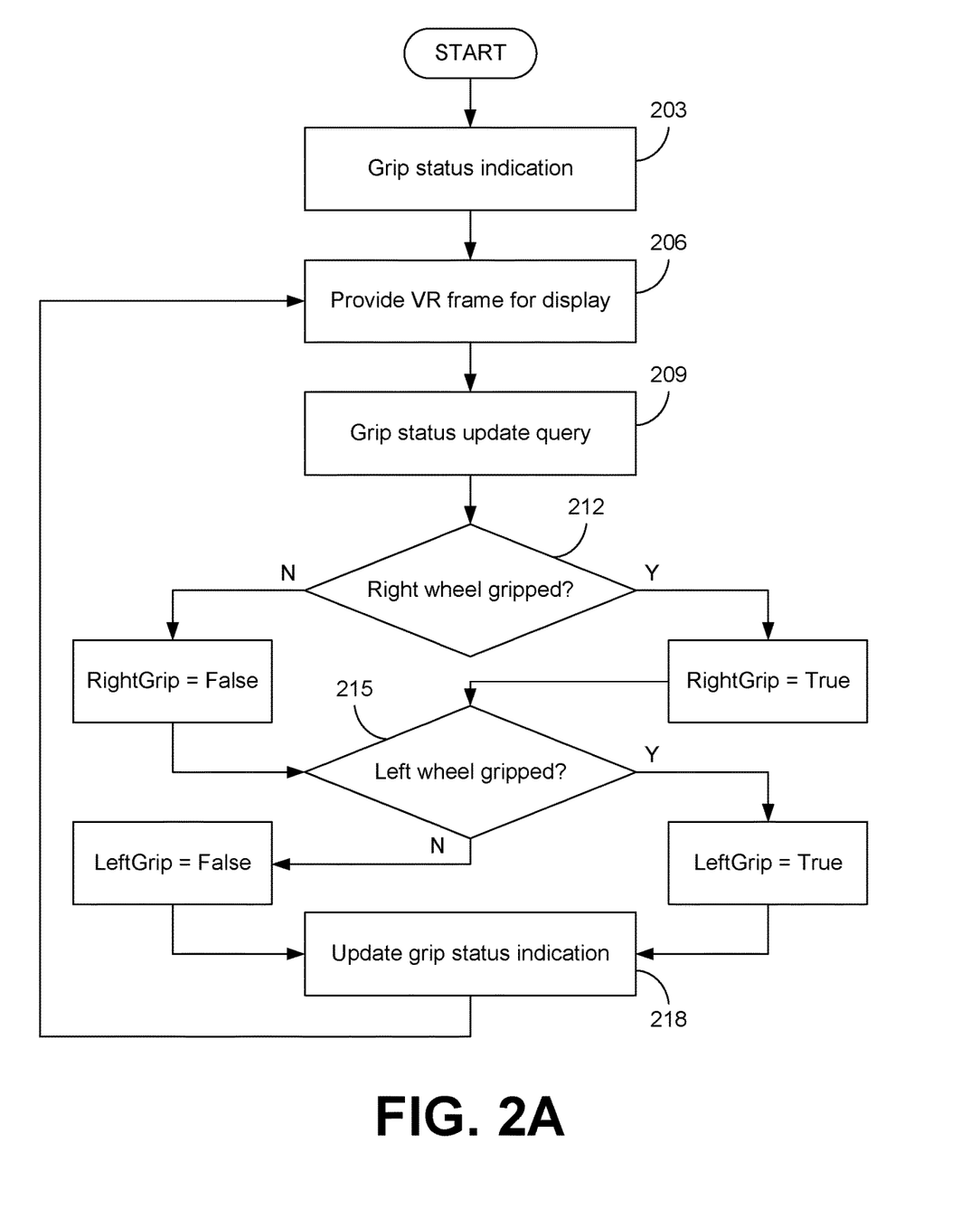
FIGS. 2A-2C are flow charts illustrating examples of simulation of a wheelchair in a VR environment as executed by the VR system of FIGS. 1A and 1B, in accordance with various embodiments of the present disclosure.

Referring now to FIG. 2A, shown is a flow chart illustrating an example of a wheel grab module that can be used to detect user interaction with the wheelchair character. Beginning at 203, a grip status indication for the wheels of the wheelchair character can be initialized (e.g., the RightSide and LeftSide are set to false or "0") to indicate that the wheels are not currently gripped. At 206, a VR frame is provided by the computing device 112 to the VR headset 103 for display to the user 106. The displayed VR frame can be based upon, e.g., a combination of the position of the user 106, the VR headset 103 and the controllers 109. For instance, if the user 106 is looking down then a portion of the wheelchair character and the user's simulated hands may be included in the displayed frame. If the user 106 is looking up, the wheelchair character may not be visible in the displayed frame. At 209, it is determined whether the user 106 is gripping the wheel of the wheelchair. For example, a grip status update query can be sent by the computing device 112 and received by the controllers 109 to determine if the user 106 is gripping or has released one or both of the wheels of the wheelchair.

The user action can be determined based upon compression of the trigger or contact pads (or pressure pads). For example, if the trigger has been compressed more than a grabbing threshold (e.g., 55%), then the user 109 can be considered to be gripping the wheel of the wheelchair character. When the trigger is already compressed (or gripped), then when the compression of the trigger is reduced to less than a releasing threshold (e.g., 30%) the grip on the wheel can be considered to be released. This combination of compression settings (e.g., a hysteresis loop) can avoid unintentional cycling of the as the user 109 varies his grip on the controller 109. In the example of FIG. 2A, the current grip status indication determines the threshold for determining whether the wheel is gripped by the user 106.

At 212, if the user 106 was not gripping the right wheel when the VR frame was presented (e.g., at initialization), then the right wheel of the wheelchair character is considered gripped when compression of the trigger exceeds (or is equal to) the grabbing threshold and the status is set to RightGrip=true. If the trigger compression does not exceed the grabbing threshold, then the status is maintained as RightGrip=false. If the user 106 was already gripping the right wheel of the wheelchair character and the trigger compression has not fallen below (or is equal to) the releasing threshold, then the status is maintained as RightGrip=true. If the compression of the trigger has fallen below the releasing threshold indicating that the wheel has been released by the user 106, then the status is set as RightGrip=false.

Similarly, if the user 106 was not gripping the left wheel when the VR frame was presented (e.g., at initialization), then at 215 the left wheel of the wheelchair character is considered gripped when compression of the trigger exceeds (or is equal to) the grabbing threshold and the status is modified to LeftGrip=true. If the trigger compression does not exceed the grabbing threshold, then the status is maintained as LeftGrip=false. If the user 106 was already gripping the left wheel of the wheelchair character and the trigger compression has not fallen below (or is equal to) the releasing threshold, then the status is maintained as LeftGrip=true. If the compression of the trigger has fallen below the releasing threshold indicating that the wheel has been released by the user 106, then the status is set as LeftGrip=false.

An indication of the grip status can then be updated at 218, and can be provided back to the computing device 112 in response to the grip status update query. The flow returns to 206 where the next VR frame can be provided by the computing device 112 to the VR headset 103 for display to the user 106. By determining the grip status at each VR frame, the latency experienced by the user 106 can be reduced to provide a real-time simulation experience. The grip status can be used in simulating the motion of the wheelchair character in response to the user 106 actions as will be discussed.

Figure 2B:
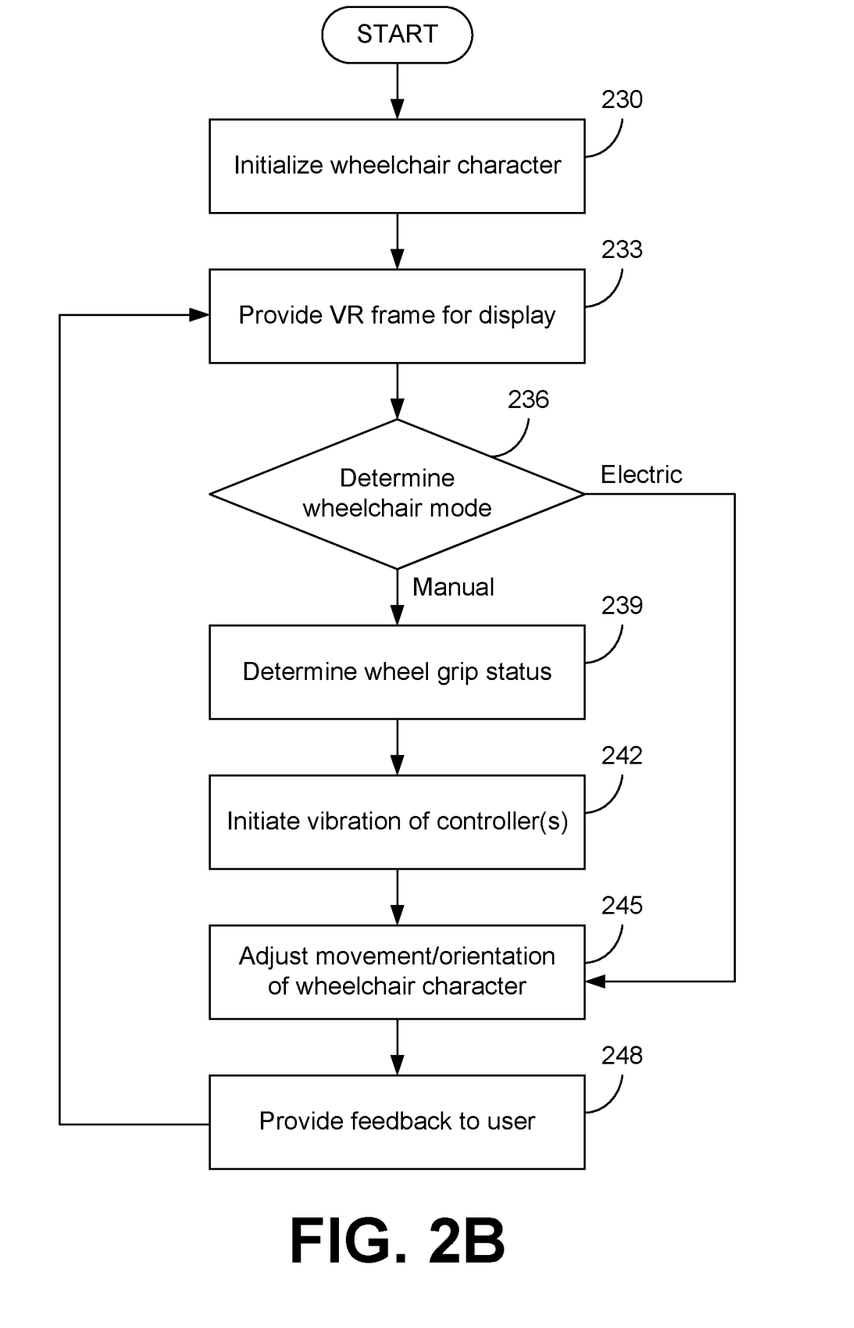

Referring next to FIG. 2B, shown is a flow chart illustrating an example of a wheelchair control module that can be used to simulate movement of the wheelchair character within the simulated environment. The simulated movement of the wheelchair character can be controlled through the use of a variety of predefined variables. For example, limits can be defined for rolling speed of the wheelchair, turn speed and velocity change (or acceleration/deceleration). Parameters for the wheelchair character such as, e.g., wheel diameter, wheel center, wheelchair width and height and other dimensions can also be defined. Center of mass and momentum can also be considered to provide a realistic simulation.

In the example of FIG. 2B, the wheelchair character can be initialized at 230. For example, the wheelchair character can be included in the VR frames of the simulated environment that will be provided to the VR headset 103 worn by the user 106. The wheelchair would initially be simulated as stationary to avoid disorientation of the user 106. In addition, an array of vibration force can be defined to provide haptic feedback (e.g., vibration) through the controllers 109. The vibration force array can be used to define, e.g., strength of the vibrations, direction of the vibrations, duration of the vibrations, etc. that are provided in response to user inputs. At 233, a VR frame is provided by the computing device 112 to the VR headset 103 for display to the user 106 as described with respect to 206 of FIG. 2A.

The wheelchair operation mode can be determined at 236 based upon selection of a corresponding input for electric operation. For instance, by pressing a defined button or a joystick on a controller 109, the user 106 can initiate electric operation of the wheelchair character. If the electric mode has been selected by the user 106, then the wheelchair character can be controlled using, e.g., a joystick on a controller 109. If the electric mode has not been selected, then the operation defaults to the manual mode of operation. By confirming the wheelchair operation mode at this point, it is possible for the user 106 to switch between electric and manual operation during the simulation.

If the manual mode is selected, then the wheel grip status can then be determined at 239 using, e.g., the wheel grip module described in FIG. 2A. Vibrational feedback can be provided to the user 106 based upon which of the controllers 109 are being gripped at 242. For example, a low level of vibration can be initiated by the computing device 112 when a controller 109 is identified as being gripped by the user 106. When the controller 109 is no longer being gripped (released) by the user 106, the vibration is stopped. In this way, the user 109 can ensure that the appropriate input is being provided to the VR simulation.

Movement and/or orientation of the wheelchair character can be adjusted at 245 in response to actions of the user 106. In the manual mode of operation, the wheelchair character can respond to detected motions of the controllers 109 held by the user 106. For example, the wheelchair character can be accelerated or slowed down by turning or grabbing the wheels, can be moved forward or backward and/or can be turned right or left by moving one or both wheels. When in the electric mode of operation, the wheelchair character can be controlled through the inputs from the controller(s) 109. For example, the wheelchair character can be accelerated or decelerated, moved forward or backward and/or turned right or left through movement of the joystick or pressing buttons on the controller 109. By allowing the joystick to return to the center position, the wheelchair character will be stopped.

At 248, feedback can be provided to the user 106 based upon the movement and/or orientation of the wheelchair character in the simulated VR environment. For example, an audio signal can be provided to the user 106 through the VR headset 103 when the wheelchair character is moving. This audio signal can simulate the noise of a wheelchair moving on a floor or of an electric motor driving the chair. In addition, vibrational feedback can be provided to the user 106 through the controllers 109 based on characteristics of the surface that is being traversed or if movement of the wheelchair character is being restricted by other objects in the simulated environment. The strength of the vibrations can correspond to the effect being experienced by the wheelchair character.

The flow of FIG. 2B then returns to 233 where the next VR frame can be provided for display by the VR headset 103. The VR frames can simulate the rotation of the wheels of the wheelchair character as it is moved within the simulated environment. By adjusting the wheelchair character simulation at each VR frame, the latency experienced by the user 106 can be reduced to provide a real-time simulation experience.

Figure 2C:
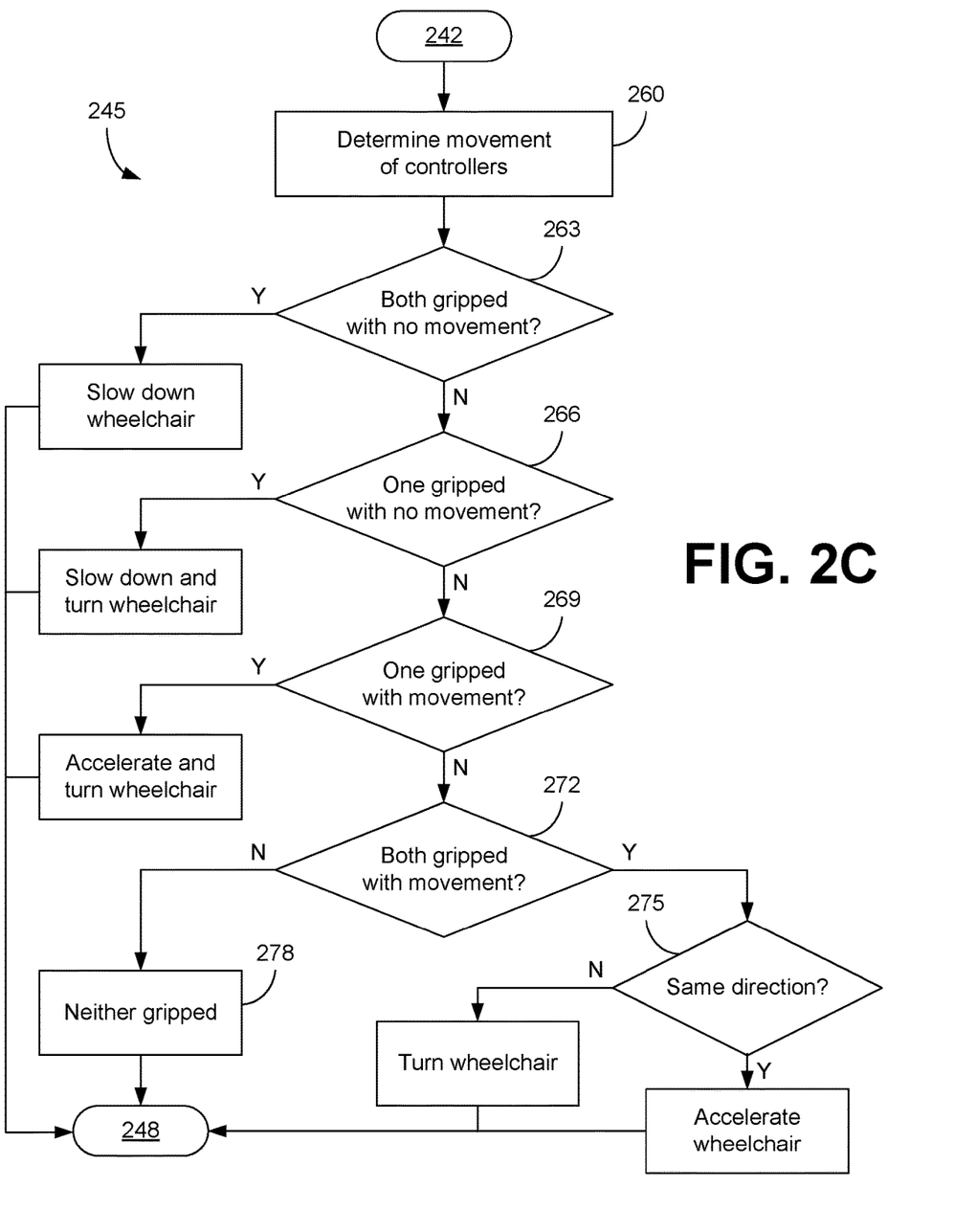

FIG. 2C shows a flow chart illustrating an example of how movement and/or orientation of the wheelchair character can be adjusted within the simulated environment at 245 of FIG. 2B. At 260, movement of the controllers 109 can be determined by the computing device 112. If both controllers 109 are gripped by the user 106, and there is no movement of the controllers at 263, then the wheelchair character is slowed in the VR simulation. The speed of the wheelchair character can be reduced in response to the grip of the user 106 on the controllers 109 (e.g., the amount of compression of the trigger). In some implementations, the wheelchair character can be turned based on the difference in grip force (or compression). For example, the amount of compression of the triggers on the controllers 109 can be equated to a breaking force being applied to the corresponding wheels of the wheelchair character. If the compression is equal (or substantially equal), then the wheelchair character can be slowed in a linear fashion. If the compression of the triggers are different, then a portion of the difference (e.g., ⅓) can be equated to a turning force on the wheelchair character. The vibrational feedback can also be adjusted or reduced as the speed of the wheelchair character decreases.

If only one controller 109 is gripped and it is not moving at 266, then the wheelchair character can be turned based on the grip force (or compression). The compression can be equated to a braking force applied to the corresponding wheel of the wheelchair character, with a portion (e.g., ⅔) causing the wheelchair character to slow down and a portion (e.g., ⅓) causing the wheelchair to turn in the direction of the gripped wheel.

If only one controller 109 is gripped and it is moving at 269, then the wheelchair character can be turned based on the speed of movement of the controller 109. The velocity of the controller 109 can be equated to an acceleration force applied to the corresponding wheel of the wheelchair character, with a portion (e.g., ⅔) causing the wheelchair character to speed up and a portion (e.g., ⅓) causing the wheelchair to turn in the direction opposite the gripped wheel.

If both controllers 109 are gripped by the user 106 and are being moved at 272, then the direction of movement is determined at 275. If the controllers 109 are moving in the same direction and are moving equal (or substantially equal) velocities at 275, then the wheelchair character can be linearly accelerated based upon the controller velocities. If the velocities of the controllers 109 are different, then a portion of the difference (e.g., ⅓) can be equated to a turning force on the wheelchair character while the remaining portion helps to accelerate the wheelchair character. The vibrational feedback can also be adjusted or increase as the speed of the wheelchair character increases. If both gripped controllers 109 are being moved in opposite directions at 272, then the force can be equated to a turning force on the wheelchair character. Unequal movement of the controllers 109 can result in both a turning and a forward or backward motion of the wheelchair character.

If it is determined that neither of the controllers 109 are being gripped by the user 106 at 275, then motion of the wheelchair character can be maintained or adjusted based upon simulated frictional effects. For example, if the wheelchair character is motionless, then it will remain motionless. If the wheelchair character is moving, then the wheelchair character can slow down or coast to a stop as a result of friction. In some cases, the simulated VR environment (e.g., ramps, hills, inclines, etc.) can be accounted for in the simulation of the movement of the wheelchair character.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A virtual reality (VR) system, comprising:
a VR headset configured to display a simulated VR environment to a user;
first and second controllers configured to receive inputs from the user; and
a computing device communicatively coupled to the VR headset and the first and second controllers, the computing device configured to execute a VR application that causes the computing device to simulate a VR character in the simulated VR environment, where the VR character simulates a physical impairment produced by a disability, the physical impairment comprising restriction of movement of the VR character to a wheelchair; and
execution of the VR application causes the computing device to simulate a wheelchair character in the simulated VR environment, where movement and orientation of the wheelchair character in the simulated VR environment is adjusted by the computing device in response to inputs received by the first and second controllers, the wheelchair character switchable between a manual mode of wheelchair operation and an electric mode of wheelchair operation.

2. The VR system of claim 1, wherein the movement and orientation of the wheelchair character in the manual mode is adjusted based upon grip and movement applied to one or both of the first and second controllers by the user.

3. The VR system of claim 2, wherein the grip is applied to the first and second controllers through a trigger on each controller.

4. The VR system of claim 2, wherein direction and velocity of each controller is determined.

5. The VR system of claim 4, wherein the movement and orientation of the wheelchair character is adjusted based upon the direction and velocity of the first and second controllers.

6. The VR system of claim 5, wherein the wheelchair character is rotated when the directions of the first and second controllers are in opposite directions.

7. The VR system of claim 6, wherein speed of rotation is based upon the velocity of the first and second controllers.

8. The VR system of claim 5, wherein the wheelchair character is rotated when the first controller is stationary and the second controller is moved in one direction.

9. The VR system of claim 5, wherein the wheelchair character is accelerated forward or backward when the directions of the first and second controllers are the same and the velocities of the first and second controllers are substantially equal.

10. The VR system of claim 2, wherein at least one of the first and second controllers is stationary when being gripped by the user.

11. The VR system of claim 10, wherein the wheelchair character is rotated when only one of the first and second controllers is gripped and stationary.

12. The VR system of claim 11, wherein speed of rotation is based upon an amount of compression of the one controller.

13. The VR system of claim 10, wherein the wheelchair character decelerates when both of the first and second controllers are gripped and stationary.

14. The VR system of claim 1, wherein the movement and orientation of the wheelchair character in the electric mode is adjusted based upon movement of a joystick on one of the first and second controllers by the user.

15. The VR system of claim 14, wherein movement and rotation of the wheelchair character is based upon direction of the joystick.

16. The VR system of claim 15, wherein the wheelchair character decelerates when the joystick returns to a center position.

17. The VR system of claim 1, wherein the first and second controllers are configured to provide vibrational feedback to the user based upon the movement of the wheelchair character in the simulated VR environment.

18. The VR system of claim 17, wherein a first level of vibrational feedback is provided to the user by the first or second controller when gripped by the user, and a second level of vibrational feedback is provided to the user when the wheelchair character is in motion.

19. The VR system of claim 18, wherein the vibrational feedback stops when the grip on the first or second controller is released by the user.

20. The VR system of claim 1, wherein the wheelchair character is switchable between the manual mode of wheelchair operation and the electric mode of wheelchair operation via at least one of the first and second controllers.

* * * * *